United States Patent
Hsu et al.

(10) Patent No.: US 9,312,759 B2
(45) Date of Patent: Apr. 12, 2016

(54) SELF-ADJUSTING REGULATOR AND METHOD OF USING SAME

(71) Applicant: TAIWAN SEMICONDUCTOR MANUFACTURING COMPANY, LTD., Hsinchu (TW)

(72) Inventors: Ying-Chih Hsu, Taichung (TW); Alan Roth, Leander, TX (US); Eric Soenen, Austin, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 255 days.

(21) Appl. No.: 14/030,573

(22) Filed: Sep. 18, 2013

(65) Prior Publication Data
US 2015/0077078 A1    Mar. 19, 2015

(51) Int. Cl.
*H02M 3/156* (2006.01)
*H02M 1/36* (2007.01)
*H02M 3/157* (2006.01)
*H02M 3/158* (2006.01)
*H02M 1/00* (2007.01)

(52) U.S. Cl.
CPC .............. *H02M 3/156* (2013.01); *H02M 1/36* (2013.01); *H02M 3/157* (2013.01); *H02M 3/1588* (2013.01); *H02M 2001/0025* (2013.01); *H02M 2003/1566* (2013.01)

(58) Field of Classification Search
CPC ..................................................... H02M 3/156
See application file for complete search history.

(56) References Cited

U.S. PATENT DOCUMENTS

| 5,155,422 | A  | * | 10/1992 | Sidman et al. | 318/560 |
|---|---|---|---|---|---|
| 6,188,209 | B1 |   | 2/2001 | Poon et al. | |
| 6,411,068 | B1 | * | 6/2002 | Willis | 323/282 |
| 7,622,820 | B1 | * | 11/2009 | Prodic et al. | 307/31 |
| 8,077,490 | B1 | * | 12/2011 | Prodic et al. | 363/65 |
| 2011/0115450 | A1 | * | 5/2011 | Pongratananukul | 323/271 |
| 2012/0119718 | A1 | * | 5/2012 | Song | 323/282 |

FOREIGN PATENT DOCUMENTS

| EP | 1175724 | 1/2002 |
|---|---|---|
| EP | 2178198 | 4/2010 |

OTHER PUBLICATIONS

Hazucha, Peter et al. A 233-MHz 80%-87% Efficient Four-Phase DC-DC Converter Utilizing Air-Core Inductors on Package, IEEE Journal of Solid-State Circuits, Apr. 2005, pp. 838-845, vol. 40, No. 40.

* cited by examiner

*Primary Examiner* — Emily P Pham
(74) *Attorney, Agent, or Firm* — Hauptman Ham, LLP

(57) ABSTRACT

A self-adjusting regulator includes a power stage adjusting an output voltage and a control loop for controlling the power stage. The control loop includes a compensator adjusting a bandwidth in response to at least one compensator control signal, and an oscillator controlling a switching speed in response to at least one oscillator control signal. The self-adjusting regulator further includes a voltage sensing control circuit controlling the control loop. The voltage sensing control circuit generating the at least one compensator control signal and the at least one oscillator control signal based on a comparison of the output voltage and a reference voltage. In a low speed mode, the compensator outputs a first bandwidth, and the oscillator outputs a first switching speed. In a high speed mode, the compensator outputs a second bandwidth greater than the first bandwidth, and the oscillator outputs a second switching speed faster than the first switching speed.

21 Claims, 5 Drawing Sheets

SELF-ADJUSTING REGULATOR AND METHOD OF USING SAME

BACKGROUND

Supplying a constant supply voltage to a load helps the load to operate in an intended manner. During operation, the load will alter which portions are active, in some instances, which induces output transient. The output change redirects the supplied voltage to portions of the load which are active. In a situation where a number of the active portions in the load increase, there is a risk that at least one portion will not have sufficient voltage to operate properly. In a situation where the number of the active portions in the load decreases, there is a risk that the active portions are damaged due to a higher voltage supplied to the active portions. A voltage regulator detects the output transient and adjusts the voltage supply to help maintain an appropriate amount of voltage supplied to the load.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

A higher operating frequency of a voltage regulator enables the voltage regulator to more rapidly respond to the output transient. However, the higher operating frequency decreases power efficiency of the voltage regulator. A higher power efficient voltage regulator has a lower operating frequency and a slower response to the output variation. For example, a voltage regulator having a fast response time operates at a frequency ranging from about 100 Megahertz (MHz) to about 500 MHz, but has a power efficiency of about 80%, in some instances. In contrast, a voltage regulator which has a power efficiency of about 90% operates at a frequency of about 5 MHz to about 10 MHz, in some instances.

Figure 1:
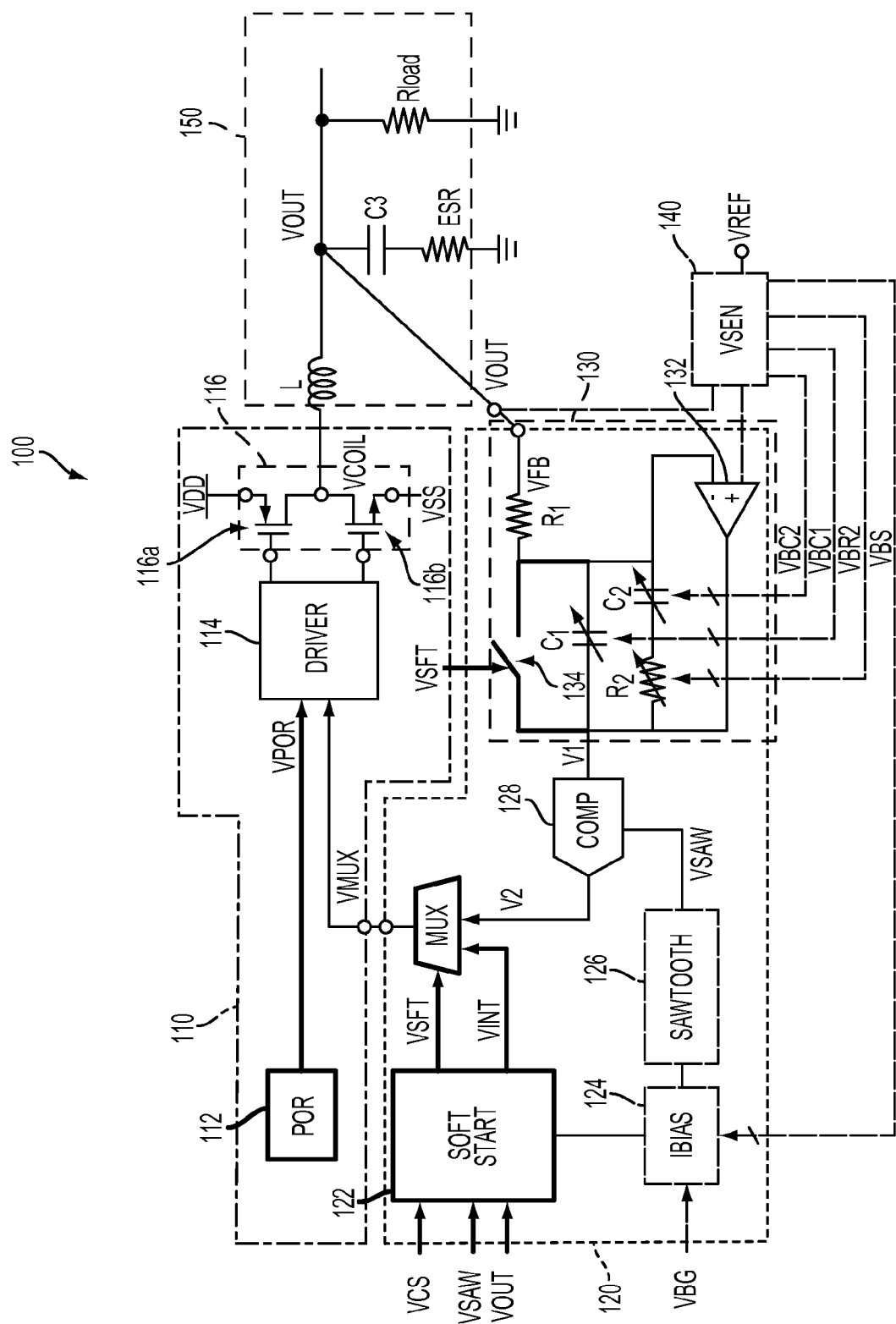
FIG. 1 is a schematic diagram of a self-adjusting regulator in accordance with one or more embodiments.

FIG. 1 is a schematic diagram of a self-adjusting regulator 100 in accordance with one or more embodiments. Self-adjusting regulator 100 is configured to operate in a high power efficiency state, e.g., about 90% power efficiency operating at about 5 MHz to about 10 MHz, during a normal operation; and operate at an increased frequency, e.g., about 100 MHz to about 500 MHz having a power efficiency of about 80%, when a change at the output is detected. As a result, an overall power efficiency of self-adjusting regulator 100 remains high, e.g. about 90%, and the self-adjusting regulator is capable of rapid response to a detected output transient, e.g., by operating at a frequency from about 100 MHz to about 500 MHz.

Self-adjusting regulator 100 includes a power stage 110 for driving a voltage level of an output voltage VOUT. Self-adjusting regulator 100 also includes a control loop 120 configured to control power stage 110. Self-adjusting regulator 100 further includes a voltage sensing control circuit (VSEN) 140 configured to control a bandwidth and switching speed of control loop 120. An output filter of 150 is configured to transfer output voltage VOUT from power stage 110 to a load.

Power stage 110 includes a power-on regulator (POR) 112 connected to a driver 114. Driver 114 is connected to control the dead time of the power stage 116.

Control loop 120 includes a soft start module 122 for protecting components of self-adjusting regulator 100 during a startup phase. Soft start module 122 is connected to a current bias module (IBIAS) 124 and a multiplexer MUX. An output of multiplexer MUX is connected to driver 114. IBIAS 124 is connected to a sawtooth oscillator 126 configured to control a frequency of components within self-adjusting regulator 100. Sawtooth oscillator 126 outputs a sawtooth oscillation voltage VSAW to a comparator 128. Comparator 128 is also configured to receive a compensation voltage V1 from a compensator 130. Based on a comparison of compensation voltage V1 and sawtooth oscillation voltage VSAW, comparator 128 outputs a comparison voltage V2 to multiplexer MUX.

Compensator 130 includes a resistor R1 connected to output voltage VOUT. Compensator 130 also includes a first variable capacitor C1 connected in series with resistor R1. In some embodiments, first variable capacitor C1 has a constant capacitance. In some embodiments, variable capacitor C1 is omitted. Compensator 130 further includes a second variable capacitor C2 connected in parallel with first variable capacitor C1, and a variable resistor R2 connected in series with the second variable capacitor. Compensator 130 further includes an op-amp comparator 132 which has a first input connected to a first side of second variable capacitor C2 and an output connected to a first side of variable resistor R2 opposite the second variable capacitor. Compensator 130 also includes a switch 134 positioned between resistor R1 and comparator 128. Switch 134 is configured to be actuated by soft start module 122 during the startup phase.

VSEN 140 is configured to supply control signals to IBIAS 124 and compensator 130. VSEN 140 receives output voltage VOUT and a reference voltage VREF. Based on a comparison of output voltage VOUT and reference voltage VREF, VSEN 140 determines whether the output transient occurred. VSEN 140 outputs a bias control signal VBS to IBIAS 124 to control the switching speed regulated by sawtooth oscillator 126. VSEN 140 outputs a signal to a second input of op-amp comparator 132. VSEN 140 also outputs a control signal VBC1 to first variable capacitor C1, a control signal VBC2 to second variable capacitor C2 and a control signal VBR2 to variable resistor R2. The control signals output to compensator 130 provide bandwidth control for self-adjusting regulator 100.

Output filter 150 includes inductor L having a first side connected to power stage circuit 116 and a second side connected to an output connecting output voltage VOUT to the load. Output filter also includes a capacitor C3 having a first side connected to the output node. An equivalent series resistor ESR is also depicted in the output filter, which donate a zero to the AC response of the loop. The Rload represents the loading of the regulator 100.

POR 112 is configured to control an initial state of driver 114 during the startup phase of self-adjusting regulator 100. POR 112 is configured to ramp up a voltage applied to the driver 114 and power stage circuit 116 during the startup phase to reduce a risk of damage to circuits in the load powered by self-adjusting regulator 100. POR 112 outputs a signal VPOR to driver 114 so that the driver does not fully activate power stage circuit 116 during the startup phase. Following the start up phase signal VPOR does not inhibit functionality of driver 114, in some embodiments.

Driver 114 is configured to control output stage 116 to regulate power supplied to the load. Driver 114 is configured to receive signal VPOR from POR 112 and a signal VMUX from multiplexer MUX. Based on signals VPOR and VMUX, driver 114 selectively actuates output stage 116 to adjust output voltage VOUT. Driver 114 includes two separated non-overlapping outputs to prevent the efficiency loss due to the shoot-thru current.

The output stage 116 includes a first transistor 116a having a gate configured to receive an output from driver 114. A first terminal of first transistor 116a is connected to an operation voltage source VDD. In some embodiments, first transistor 116a is a p-type transistor, such as a p-type metal oxide semiconductor (PMOS) transistor, and the first terminal is a source of the first transistor. The output stage 116 further includes a second transistor 116b having a gate configured to receive an output from driver 114. A first terminal of second transistor 116a is connected to a reference voltage VSS, e.g., a ground voltage. In some embodiments, second transistor 116b is an n-type transistor, such as an n-type metal oxide semiconductor (NMOS) transistor, and the first terminal is a source of the second transistor. A second terminal of first transistor 116a is connected to a second terminal of second transistor 116b. The second terminals of first transistor 116a and second transistor 116b are connected to inductor L of output filter 150. In some embodiments, the second terminals are drains of first transistor 116a and second transistor 116b. Based on the duty cycle of the received output from driver 114, the output level of VOUT can be changed.

Soft start module 122 is configured to protect components of self-adjusting regulator 100 during the startup phase. Soft start module 122 receives an input VCS from signal of an external capacitor. In some embodiments, input VCS is provided by an internal current source connected to an internal capacitor. Soft start module 122 also receives a feedback input from output voltage VOUT as well as sawtooth oscillation voltage VSAW as an input. Soft start module 122 compares these inputs and outputs a selector signal VSFT to multiplexer MUX. Soft start module 122 also outputs an initial voltage VINT which is below an operating voltage of self-adjusting regulator 100 during the startup phase. Soft start module 122 ramps up initial voltage VINT as the startup phase progresses to gradually increase the initial voltage to match the operating voltage.

IBIAS 124 is configured to adjust a current supplied to sawtooth oscillator 126 and soft start module 122. IBIAS 124 receives a bandgap signal VBG which indicates an operating bandwidth during normal operation of self-adjusting regulator 100. IBIAS 124 receives control signal VBS from VSEN 140 and adjusts the supplied current in response to the control signal. During a detected output transient, IBIAS 124 increases the supplied current to sawtooth oscillator 126 which increases the frequency of sawtooth oscillation voltage VSAW.

Sawtooth oscillator 126 is configured to generate sawtooth voltage signal VSAW in response to the current supplied by IBIAS 124. A frequency of sawtooth voltage signal VSAW controls a switching speed of components in self-adjusting regulator 100 such as soft start module 122 and comparator 128. During normal operation, sawtooth oscillator 126 generates a lower frequency sawtooth voltage signal VSAW to maintain higher power efficiency. In response to a detected change in output transient by the load, sawtooth oscillator 126 generates an increased frequency sawtooth voltage signal VSAW to decrease a time period between the output transient and correction of output voltage VOUT. As the supplied current from IBIAS 124 increases, a frequency of sawtooth voltage signal VSAW increases. In some embodiments, an amount of increase in the frequency of sawtooth voltage signal VSAW is not linear with respect to the supplied current.

Comparator 128 is configured to receive a first input from sawtooth oscillator 126 and a second input from compensator 130. The first input is sawtooth oscillation voltage VSAW and the second input is compensation voltage V1. Comparator 128 is configured to output comparison voltage V2 to multiplexer MUX. As the frequency of sawtooth voltage signal VSAW increases, a frequency of comparison voltage signal V2 also increases. The increased comparison voltage V2 in turn increases a switching speed in driver 114 and output stage 116 (after passing through multiplexer MUX).

Multiplexer MUX is configured to receive comparison voltage V2 from comparator 128 and initial voltage VINT from soft start module 122. Multiplexer MUX is also configured to receive selector signal VSFT to determine which input signal to output. Multiplexer MUX is configured to output a multiplexer signal VMUX to driver 114. During a startup phase, selector signal VSFT controls multiplexer MUX to output initial voltage VINT to reduce the risk of damage to components in self-adjusting regulator 100. Following the startup phase, selector signal VSFT controls multiplexer MUX to output comparison voltage V2 in order to control output voltage VOUT.

Compensator 130 is configured to adjust compensation voltage V1 in response to a detected output transient. Compensator 130 is configured to receive output voltage VOUT at a first side of resistor R1, the control signal from VSEN 140 as the second input for op-amp comparator 132 and control signals VBC1, VBC2 and VBR2 at first variable capacitor C1, second variable capacitor C2 and variable resistor R2, respectively. Based on the inputs, compensator 130 is configured to adjust a bandwidth of the of compensation voltage V1 supplied to comparator 128. In the normal operation mode, compensator 130 is configured to output a lower bandwidth compensation voltage V1. Upon detection of the output transient, compensator 130 is configured to output a higher bandwidth compensation voltage V1 to comparator 128 than during the normal operation state.

Switch 134 in compensator 130 is configured to receive selector signal VSFT. During the startup phase, switch 134 is closed to directly connect resistor R1 to comparator 128.

Following the startup phase, switch 134 is opened to facilitate bandwidth control based on the received control signals from VSEN 140.

VSEN 140 is configured to receive reference voltage VREF and output voltage VOUT as inputs. VSEN 140 is configured to detect a change in output transient by comparing reference voltage VREF to output voltage VOUT. Based on the comparison, VSEN generates control signals VBS, VBC1, VBC2 and VBR2 to adjust the frequency of sawtooth oscillation voltage VSAW and a bandwidth of compensation voltage V1. During normal operation, VSEN 140 outputs control signals VBS, VBC1, VBC2 and VBR2 so that self-adjusting regulator 100 operates in a higher power efficiency mode, e.g., power efficiency of about 90% with a switching rate ranging from about 5 MHz to about 10 MHz. When VSEN 140 detects a change in output transient, through a change in output voltage VOUT relative to reference voltage VREF, the VSEN outputs control signals VBS, VBC1, VBC2 and VBR2 so that self-adjusting regulator 100 operates in a high speed mode, e.g., switching rate ranging from about 100 MHz to about 500 MHz and a power efficiency of about 80%.

For example, during normal operation, VSEN 140 determines output voltage VOUT is equal to reference voltage VREF, within a pre-determined threshold. In some embodiments, the pre-determined threshold ranges from about 0.8% to about 1.2% of the output voltage. VSEN 140 outputs control signal VBS to IBIAS 124 having a value of "0" in a 5-bit decimal. VSEN 140 outputs control signal VBC2 to second variable capacitor C2 having a value of "4" in a 3-bit decimal. VSEN 140 outputs control signal VBR2 to variable resistor R2 having a value of "0" in a 4-bit decimal. As a result, self-adjusting regulator 100 operates in a high efficient mode, in which a switching rate of the self-adjusting regulator ranges from about 5 MHz to about 10 MHz at a power efficiency of about 90%. During the output transient period, output voltage VOUT increases or decreases. VSEN 140 detects the change in output voltage VOUT by comparing the output voltage to reference voltage VREF. VSEN 140 determines the difference between output voltage VOUT and reference voltage VREF exceeds the pre-determined threshold. In response to the change in output voltage VOUT, VSEN 140 outputs control signal VBS having a value of "31" to IBIAS 124 to increase the current supplied by the IBIAS to sawtooth oscillator 126 to increase the frequency of sawtooth voltage signal VSAW. VSEN 140 outputs control signal VBC2 having a value of "0" to second variable capacitor; and control signal VBR2 having a value of "7" to variable resistor R2. As a result, self-adjusting regulator 100 operates in a high speed mode, in which a switching rate of the self-adjusting regulator ranges from about 100 MHz to about 500 MHz at a power efficiency of about 80%. One of ordinary skill would recognize the above values of the control signals are merely examples and that this description is not limited to the above mentioned control values.

Output filter 150 is configured to connect output voltage VOUT to the load. Output filter 150 includes inductor L having a first side configured to receive voltage VCOIL from output stage 116 and transfer output voltage VOUT to a second side of the inductor. Capacitor C3 is connected to output voltage VOUT to help buffer changes in the output voltage. Effective series resistor ESR is included in output filter 150 to account for resistance introduced by non-ideal operation in components of self-adjusting regulator 100. Resistor Rload is included in output filter 150 as a symbol of the load.

Figure 2A:
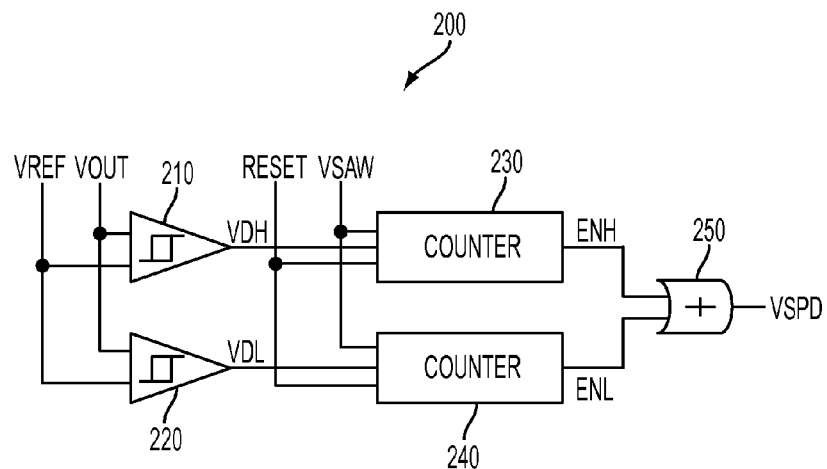
FIG. 2A is a schematic diagram of a sensing circuit of a self-adjusting regulator in accordance with one or more embodiments.

FIG. 2A is a schematic diagram of a sensing circuit 200 of a self-adjusting regulator in accordance with one or more embodiments. In some embodiments, sensing circuit 200 is part of a sensing control circuit, e.g., VSEN 140 (FIG. 1). Sensing circuit 200 includes a first comparator 210 configured to receive output voltage VOUT and reference voltage VREF as inputs. First comparator 210 is configured to compare output voltage VOUT with reference voltage VREF to determine whether the output voltage is more than a first pre-determined threshold above the reference voltage and output a voltage difference high signal VDH. Sensing circuit 200 also includes a second comparator 220 configured to receive output voltage VOUT and reference voltage VREF as inputs. Second comparator 220 is configured to compare output voltage VOUT with reference voltage VREF to determine whether the output voltage is more than a second pre-determined threshold below the reference voltage and output a voltage difference low signal VDL. In some embodiments, the first pre-determined threshold has an absolute value equal to an absolute value of the second pre-determined threshold. In some embodiments, the absolute value of the first pre-determined threshold is different from the absolute value of the second pre-determined value.

First comparator 210 is connected to a first counter 230 so that the first counter receives voltage difference high signal VDH as an input. First counter 230 is also configured to receive a reset signal RESET and sawtooth oscillation voltage VSAW as inputs. First counter 230 is configured to output an enable high signal ENH having a same logic state as voltage difference high signal VDH until a number of cycles of sawtooth oscillation voltage VSAW reaches a first pre-determined number of cycles. In some embodiments, the first pre-determined number of cycles is a number of cycles used to settle the output. In some embodiments, the first pre-determined number of cycles ranges from about 5 to about 10. Following the first pre-determined number of cycles, reset signal RESET returns enable high signal ENH to a logically low state and resets first counter 230 to a count of zero.

Second comparator 220 is connected to a second counter 240 so that the second counter receives voltage difference low signal VDL as an input. Second counter 240 is also configured to receive reset signal RESET and sawtooth voltage signal VSAW as inputs. Second counter 240 is configured to output an enable low signal ENL having a same logic state as voltage difference low signal VDL until a number of cycles of sawtooth voltage signal VSAW reaches a second pre-determined number of cycles. Following the second pre-determined number of cycles, reset signal RESET returns enable low signal ENL to a logically low state. In some embodiments, the first pre-determined number of cycles is equal to the second pre-determined number of cycles. In some embodiments, the first pre-determined number of cycles is different from the second pre-determined number of cycles.

An OR gate 250 receives enable high signal ENH and enable low signal ENL as inputs. OR gate 250 outputs speed mode signal VSPD. When speed mode signal VSPD is in a high logic state, a voltage sensing control circuit, e.g., VSEN 140 (FIG. 1), generates control signals so that a self-adjusting regulator, e.g., self-adjusting regulator 100, operates in a high speed mode. When speed mode signal VSPD is in a low logic state, the voltage sensing control circuit generates control signals to that the self-adjusting regulator operates in a low speed mode. A power efficiency of the low speed mode is greater than a power efficiency of the high speed mode.

Figure 2B:
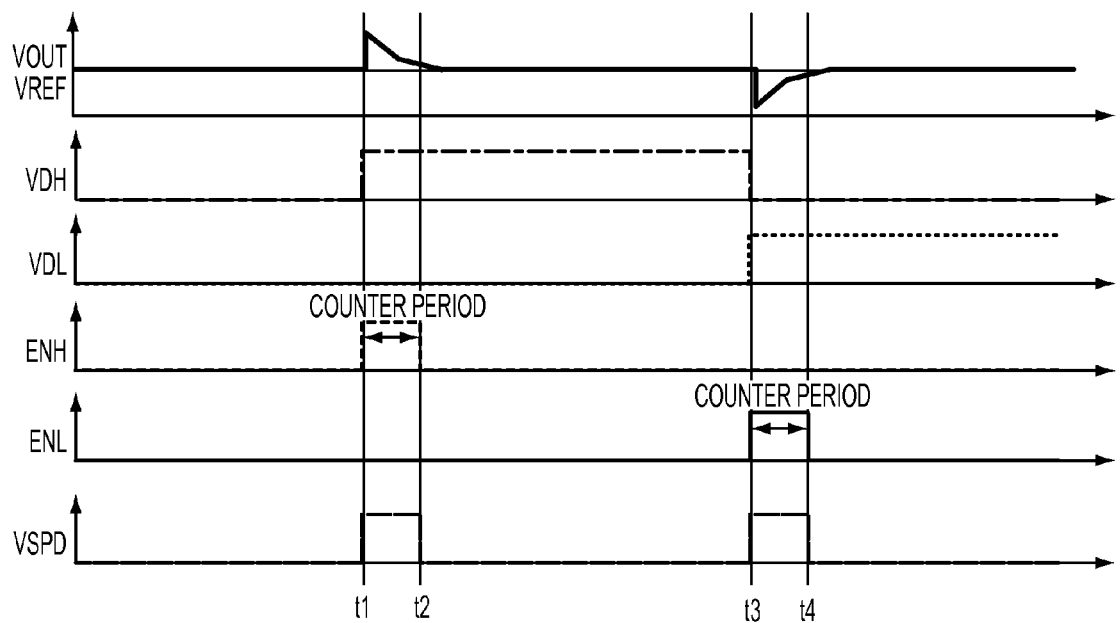
FIG. 2B is a waveform diagram of voltages at various points within the sensing circuit of FIG. 2A during operation in accordance with one or more embodiments.

FIG. 2B is a waveform diagram of voltages at various points within sensing circuit 200 during operation in accordance with one or more embodiments. At time t1, output voltage VOUT increases due to a change of output transient. The difference between output voltage VOUT and reference voltage VREF exceeds the first pre-determined threshold. First comparator 210 outputs voltage difference high signal VDH in a high logic state due to the determined difference between output voltage VOUT and reference voltage VREF. Second comparator 220 does not change a value of voltage difference low signal VDL. In response to the logically high voltage difference high signal VDH, first counter 230 outputs enable high signal ENH at a logically high state. Second counter 240 outputs enable low signal ENL at a logically low state due to voltage difference low signal VDL being in the low logic state. OR gate 250 outputs speed mode signal VSPD at a high logic state to transition the self-adjusting regulator to a high speed state. At time t2, a duration of the first pre-determined number of cycles of sawtooth oscillation voltage VSAW following t1, reset signal RESET prompts first counter 210 to transition enable high signal ENH to a low logic state. In response, OR gate 250 outputs a logically low speed mode signal VSPD. Voltage difference high signal VDH remains logically high until output voltage VOUT drops below reference voltage VREF by the second pre-determined threshold.

At time t3, output voltage VOUT decreases due to output transient. The difference between output voltage VOUT and reference voltage VREF exceeds the second pre-determined threshold. Second comparator 220 outputs voltage difference low signal VDL in a high logic state due to the determined difference between output voltage VOUT and reference voltage VREF. First comparator 210 transitions voltage difference high signal VDH to a low logic state. In response to the logically high voltage difference low signal VDL, second counter 240 outputs enable low signal ENL at a logically high state. First counter 230 outputs enable high signal ENH at a logically low state due to voltage difference high signal VDH being in the low logic state. OR gate 250 outputs speed mode signal VSPD at a high logic state to transition the self-adjusting regulator into a high speed state. At time t4, a duration of the second pre-determined number of cycles of sawtooth oscillation voltage VSAW following t3, reset signal RESET prompts second counter 240 to transition enable low signal ENL to a low logic state. In response, OR gate 250 outputs a logically low speed mode signal VSPD.

Figure 3:
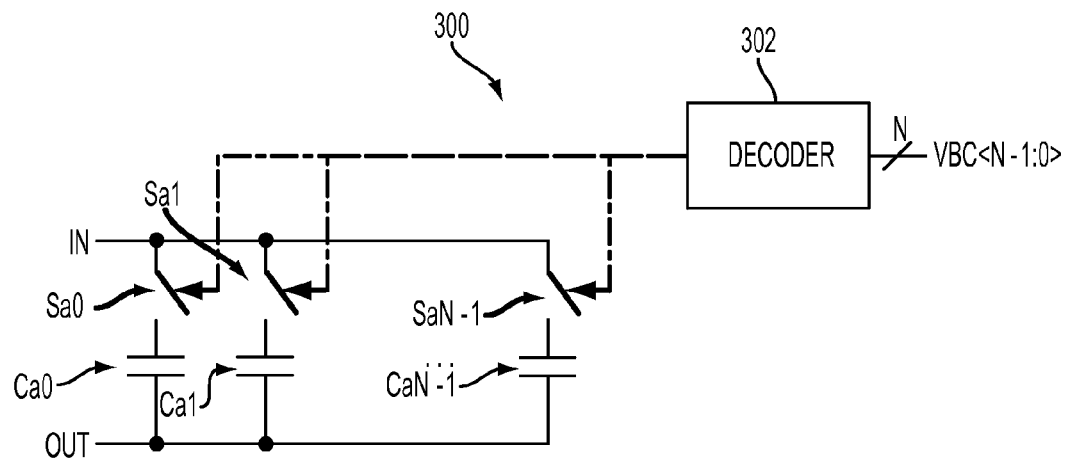
FIG. 3 is a schematic diagram of a variable capacitor of a self-adjusting regulator in accordance with one or more embodiments.

FIG. 3 is a schematic diagram of a variable capacitor 300 of a self-adjusting regulator in accordance with one or more embodiments. In some embodiments, variable capacitor 300 is first variable capacitor C1 or second variable capacitor C2 of self-adjusting regulator 100 (FIG. 1). Variable capacitor 300 includes a decoder 302 configured to receive a capacitor control signal, e.g., control signal VBC2 (FIG. 1). Variable capacitor 300 also includes N capacitors Ca0, Ca1 . . . CaN−1 capable of being connected in parallel. Variable capacitor 300 also includes N switches Sa0, Sa1 . . . SaN−1. Each switch of the N switches is connected to a corresponding capacitor of the N capacitors. In some embodiments, N is equal to 8. In some embodiments, N is greater than or less than 8. Decoder 302 is connected to each switch of the N switches.

Decoder 302 is configured to decode the capacitor control signal and selectively close switches of the N switches based on the decoded capacitor control signal. Each of the closed switches connects a corresponding capacitor in parallel between an input and an output of variable capacitor 300.

Figure 4:
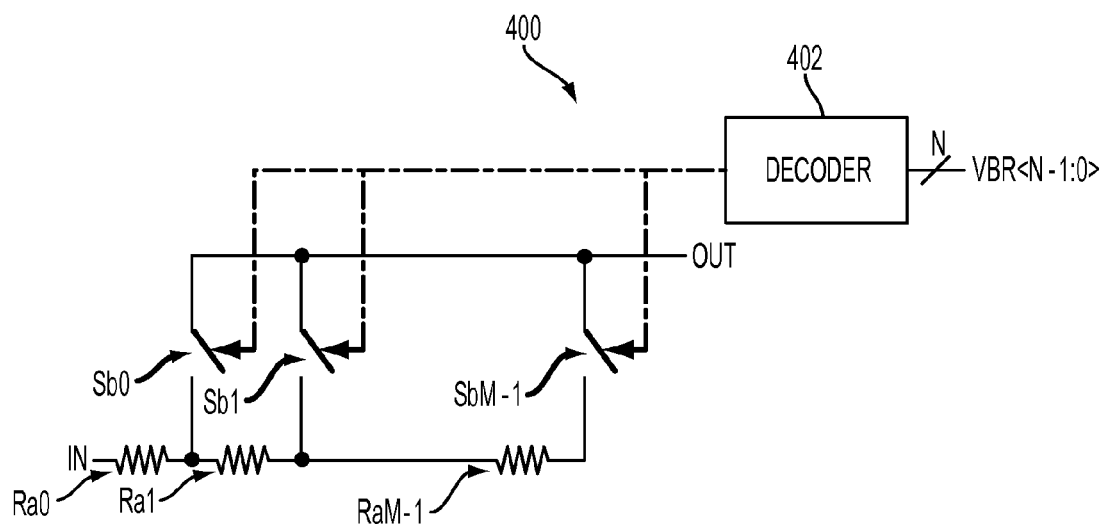
FIG. 4 is a schematic diagram of a variable resistor of a self-adjusting regulator in accordance with one or more embodiments.

FIG. 4 is a schematic diagram of a variable resistor 400 of a self-adjusting regulator in accordance with one or more embodiments. In some embodiments, variable resistor 400 is variable resistor R1 of self-adjusting regulator 100 (FIG. 1). Variable resistor 100 includes a decoder 402 configured to receive a resistor control signal, e.g., control signal VBR2 (FIG. 1). Variable resistor 400 also includes M resistors Ra0, Ra1 . . . RaM−1 capable of being connected in parallel. Variable resistor 400 also includes M switches Sb0, Sb1 . . . SbM−1. Each switch of the M switches is connected to a corresponding resistor of the M resistors. In some embodiments, M is equal to 16. In some embodiments, M is greater than or less than 16. Decoder 402 is connected to each switch of the M switches.

Decoder 402 is configured to decode the resistor control signal and selectively close switches of the M switches based on the decoded resistor control signal. Each of the closed switches connects a corresponding resistor in parallel between an input and an output of variable resistor 400.

Figure 5:
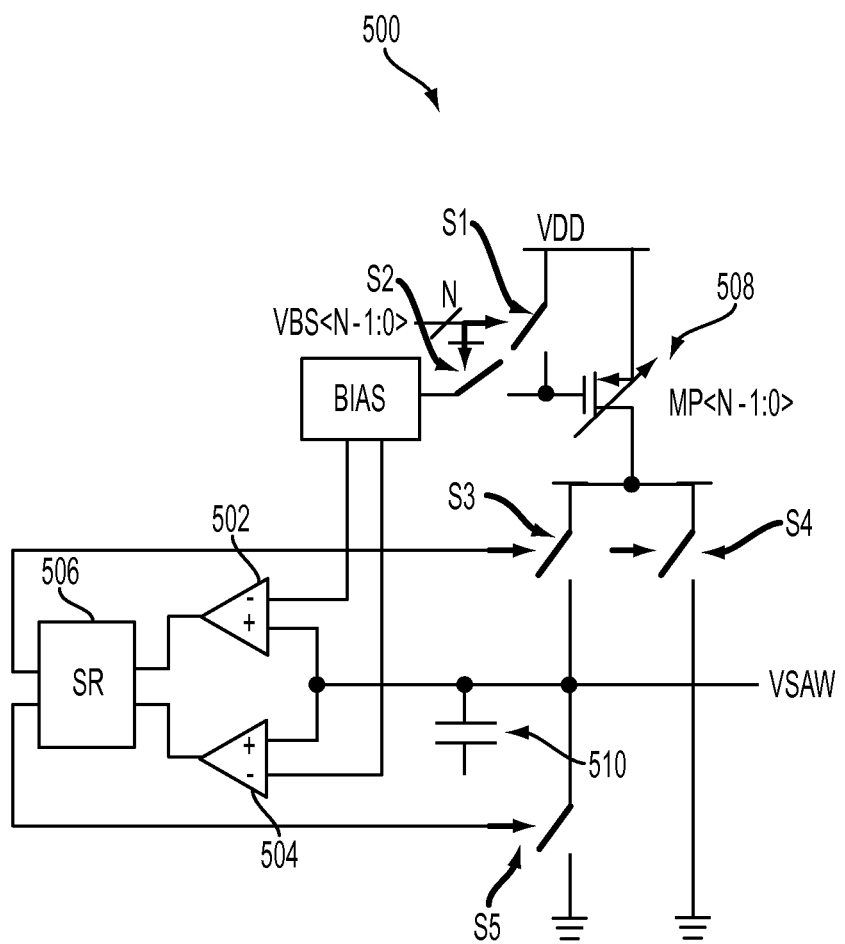
FIG. 5 is a schematic diagram of a sawtooth oscillator of a self-adjusting regulator in accordance with one or more embodiments.

FIG. 5 is a schematic diagram of a sawtooth oscillator 500 of a self-adjusting regulator in accordance with one or more embodiments. In some embodiments, sawtooth oscillator 500 is used as sawtooth oscillator 126 of self-adjusting regulator 100 (FIG. 1). Sawtooth oscillator 500 includes a first comparator 502 configured to receive a bias signal from a bias circuit as a first input. In some embodiments, the bias circuit is IBIAS 124 (FIG. 1). Sawtooth oscillator 500 further includes a second comparator 504 configured to receive a bias signal from the bias circuit as a first input. A second input of first comparator 502 is connected to a second input of second comparator 504. An output of first comparator is connected to a switch regulator (SR) 506. An output of second comparator is connected to SR 506.

Sawtooth oscillator 500 further includes a variable transistor 506. Variable transistor 508 includes a first terminal connected to an operating voltage VDD. The bias circuit also actuates a first switch S1 and a second switch S2. When switch S1 is closed a gate of variable transistor 508 is connected to operating voltage VDD, making the variable transistor a diode connected transistor. When second switch S2 is closed the bias circuit is also connected to the gate of variable transistor 508. A second terminal of variable transistor 506 is connected to a third switch S3 and a fourth switch S4. Third switch S3 and fourth switch S4 are connected in series.

An output of SR 506 selectively actuates third switch S3 and fourth switch S4. When third switch S3 is closed the second terminal of variable transistor 508 is connected to the second input of first comparator 502 and second comparator 504. When fourth switch S4 is closed the second terminal of variable transistor 508 is connected to a ground voltage. An output of SR 506 is also configured to selectively actuate a fifth switch S5 which is connected to third switch S3 in series. When both fifth switch S5 and third switch S3 are closed, the second terminal of variable transistor is connected to the ground voltage.

Sawtooth oscillator 500 also includes a capacitor 510 which is electrically connected to the second input of first comparator 502 and second comparator 504. The second input of first comparator 502 and second comparator 504 are also connected to sawtooth oscillation voltage VSAW.

In operation, the bias circuit supplies the bias signal to first input of first comparator 502 and second comparator 504. Capacitor 510 increases a voltage level of sawtooth oscillation voltage VSAW. The bias circuit closes first switch S1 and second switch S2 to electrically connect operating voltage VDD to the second terminal of variable transistor 508. Once capacitor 510 charges sawtooth oscillation voltage VSAW to a voltage level greater than the bias signal, first comparator 502 and second comparator 504 output logically high signals to SR 506. SR 506 then closes third switch S3, fourth switch S4 and fifth switch S5 to electrically connect sawtooth oscillation voltage VSAW to the ground voltage. Capacitor 510 is also connected to operating voltage VDD to re-charge the capacitor. This cycle is repeated to generate sawtooth oscillation voltage VSAW.

Figure 6:
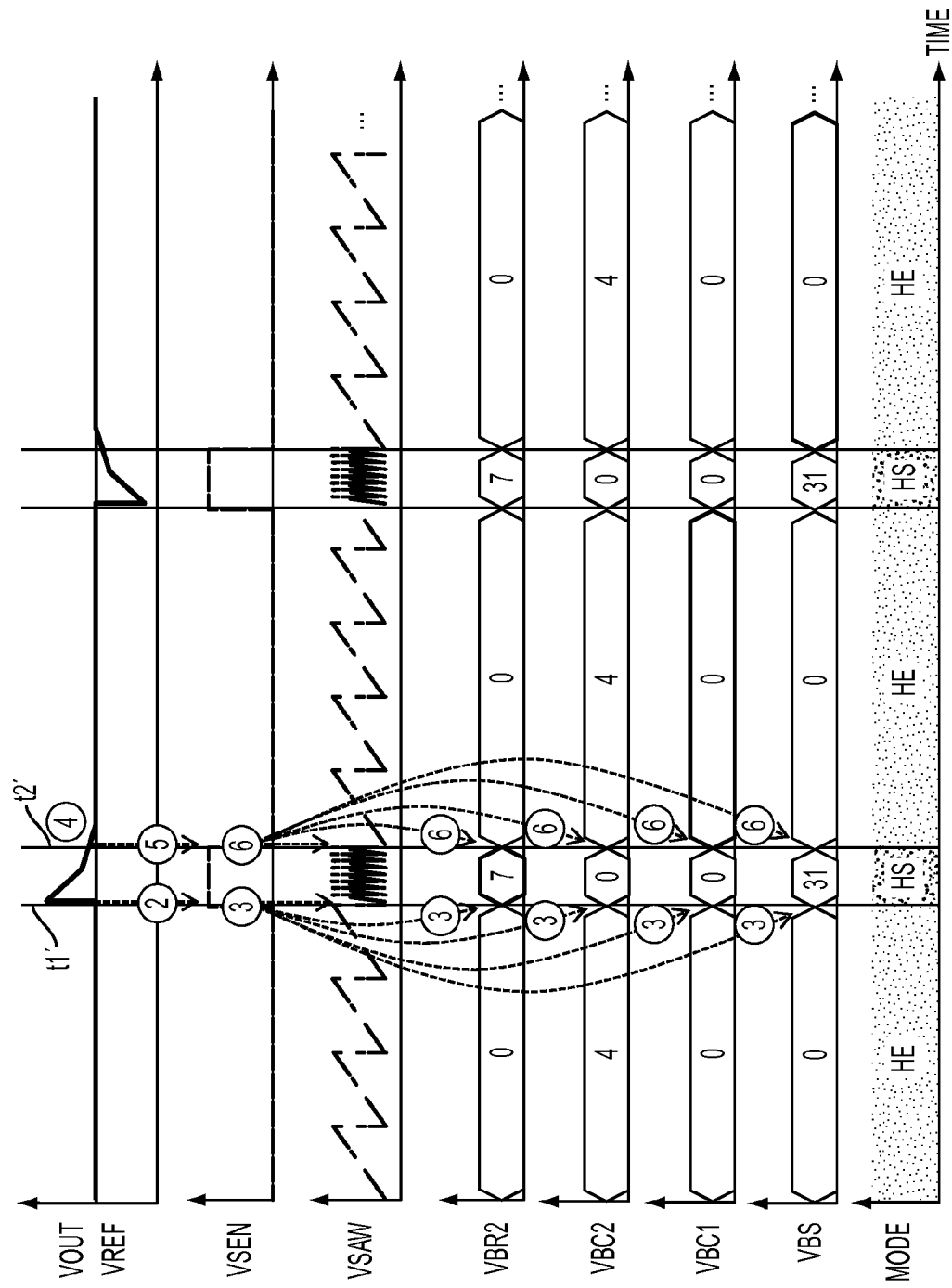
FIG. 6 is a waveform diagram of voltages at various locations within the self-adjusting regulator of FIG. 1 during operation in accordance with one or more embodiments.

FIG. 6 is a waveform diagram 600 of voltages at various locations within the self-adjusting regulator 100 during operation in accordance with one or more embodiments. At time t1', output voltage VOUT increases due to load transient. A difference between output voltage VOUT and reference voltage VREF exceeds the first pre-determined threshold. The increase in VOUT results in VSEN 140 generating control signal VBS to increase the switching speed of self-adjusting regulator 100, as shown by the increased frequency of VSAW. VSEN 140 also generates control signals VBC1, VBC2 and VBR2 to increase the bandwidth of self-adjusting regulator 100. Self-adjusting regulator 100 operates in a high speed mode while the difference between output voltage VOUT and reference voltage VRED is greater than the first pre-determined threshold.

Self-adjusting regulator 100 reduces output voltage VOUT to be within the first pre-determined threshold of reference voltage VREF, at time t2'. In response to the reduction in output voltage VOUT, VSEN 140 generates control signal VBS to reduce the switching speed of self-adjusting regulator 100. VSEN 140 also generates control signals VBC1, VBC2 and VBR2 to decrease the bandwidth of self-adjusting regulator 100. Self-adjusting regulator 100 operates in a high power efficiency mode while the different between output voltage VOUT and reference voltage is less than the first pre-determined threshold.

One aspect of this description relates to a self-adjusting regulator. The self-adjusting regulator includes a power stage configured to adjust an output voltage and a control loop configured to control the power stage. The control loop includes a compensator configured to adjust a bandwidth of the self-adjusting regulator in response to at least one compensator control signal, and an oscillator configured to output an oscillation signal for controlling a switching speed of the self-adjusting regulator in response to at least one oscillator control signal. The self-adjusting regulator further includes a voltage sensing control circuit configured to control the control loop, the voltage sensing control circuit configured to receive the output voltage and a reference voltage and to generate the at least one compensator control signal and the at least one oscillator control signal based on a comparison of the output voltage and the reference voltage. In a low speed mode, the compensator is configured to output a first bandwidth, and the oscillator is configured to output a first switching speed. In a high speed mode the compensator is configured to output a second bandwidth greater than the first bandwidth, and the oscillator is configured to output a second switching speed faster than the first switching speed.

Another aspect of this description relates to a method of using a self-adjusting regulator. The method includes generating an output voltage, receiving a reference voltage and determining a difference between the reference voltage and the output voltage. The method further includes generating at least one oscillation control signal to adjust a switching rate of the self-adjusting regulator based on the difference between the reference voltage and the output voltage. The method further includes generating at least one bandwidth control signal to adjust a bandwidth of the self-adjusting regulator based on the difference between the reference voltage and the output voltage.

Still another aspect of this description relates to a method of using a self-adjusting regulator. The method includes generating an output voltage using a power stage and controlling the power stage using a control loop configured to control the power stage. Controlling the power stage includes adjusting a bandwidth of the self-adjusting regulator in response to at least one compensator control signal using a compensator, and generating an oscillation signal using an oscillator to control a switching speed of the self-adjusting regulator in response to at least one oscillator control signal. The method further includes controlling the control loop using a voltage sensing control circuit. Controlling the control loop includes generating the at least one compensator control signal and the at least one oscillator control signal based on a comparison of the output voltage and a reference voltage. In a low speed mode operating the self-adjusting regulator at a first bandwidth generated by the compensator, and at a first switching speed generated by the oscillator. In a high speed mode operating the self-adjusting regulator at a second bandwidth generated by the compensator, and at a second switching speed generated by the oscillator, wherein the second bandwidth is greater than the first bandwidth, and the second switching speed faster than the first switching speed.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A self-adjusting regulator comprising:
    a power stage configured to adjust an output voltage;
    a control loop configured to control the power stage, the control loop comprising:
        a compensator configured to adjust a bandwidth of the self-adjusting regulator in response to at least one compensator control signal, and
        an oscillator configured to output an oscillation signal for controlling a switching speed of the self-adjusting regulator in response to at least one oscillator control signal; and
    a voltage sensing control circuit configured to control the control loop, the voltage sensing control circuit configured to receive the output voltage and a reference voltage and to generate the at least one compensator control signal and the at least one oscillator control signal based on a comparison of the output voltage and the reference voltage,
    wherein in a low speed mode the compensator is configured to output a first bandwidth, and the oscillator is configured to output a first switching speed, and
    in a high speed mode the compensator is configured to output a second bandwidth greater than the first bandwidth, and the oscillator is configured to output a second switching speed faster than the first switching speed.

2. The self-adjusting regulator of claim 1, wherein the compensator comprises:
    at least one variable capacitor, wherein each variable capacitor of the at least one variable capacitor is configured to receive a corresponding compensator control signal of the at least one compensator control signal; and
    at least one variable resistor, wherein each variable resistor of the at least one variable resistor is configured to receive a corresponding compensator control signal of the at least one compensator control signal.

3. The self-adjusting regulator of claim 2, wherein the at least one variable capacitor comprises a first variable capacitor and a second variable capacitor connected in parallel, and the at least one variable resistor comprises a first variable resistor connected in series with the second variable capacitor.

4. The self-adjusting regulator of claim 2, wherein the at least one variable capacitor comprises:
   a decoder circuit configured to receive the corresponding compensator control signal of the at least one compensator control signal, and to output a decoder signal;
   N switches, each switch of the N switches configured to receive the decoder signal; and
   N capacitors, each capacitor of the N capacitors connected to a corresponding switch of the N switches, wherein the N capacitors are configured to be connected in parallel.

5. The self-adjusting regulator of claim 2, wherein the at least one resistor comprises:
   a decoder circuit configured to receive the corresponding compensator control signal of the at least one compensator control signal, and to output a decoder signal;
   M switches, each switch of the M switches configured to receive the decoder signal; and
   M resistor, each resistor of the M resistor connected to a corresponding switch of the M switches, wherein the M resistors are configured to be connected in parallel.

6. The self-adjusting regulator of claim 1, wherein the control loop further comprises a bias circuit configured to receive the at least on oscillation control signal and adjust a bias current in response to the at least one oscillation control signal, wherein the oscillator is configured to receive the bias current.

7. The self-adjusting regulator of claim 1, wherein the control loop further comprising a comparator configured to receive an output of the compensator and an output of the oscillator, the comparator configured to output a comparator signal receivable by the power stage.

8. The self-adjusting regulator of claim 7, wherein the control loop further comprises:
   a soft start module configured to control a voltage supplied to the power stage during a startup operation, to generate a startup voltage, and to generate a selector signal; and
   a multiplexer configured to receive the comparator signal as a first input, the startup voltage as a second input, and the selector signal as a selector input, wherein the multiplexer is electrically connected between the comparator and the power stage.

9. The self-adjusting regulator of claim 1, wherein the power stage comprises:
   a driver configured to receive a signal from the control loop and to output a driver signal; and
   a power stage circuit configured to receive the driver signal and adjust the output voltage.

10. The self-adjusting regulator of claim 9, wherein the voltage sensing control circuit comprises:
    a first transistor having a gate configured to receive the driver signal and a first terminal connected to an operating voltage source; and
    a second transistor having a gate configured to receive the driver signal and a first terminal connected to a reference voltage, wherein a second terminal of the first transistor is connected to a second terminal of the second transistor.

11. The self-adjusting regulator of claim 1, wherein the voltage sensing control circuit comprises a voltage sensing circuit, and the voltage sensing circuit comprises:
    a first comparator configured to receive the output voltage and the reference voltage and to output a first voltage difference signal;
    a second comparator configured to receive the output voltage and the reference voltage and to output a second voltage difference signal;
    a first counter configured to receive a reset signal, the oscillation signal and the first voltage difference signal and to output a first enable signal;
    a second counter configured to receive the reset signal, the oscillation signal and the second voltage difference signal, and to output a second enable signal; and
    an OR gate configured to receive the first enable signal and the second enable signal, and to output a speed mode signal for generating the at least one oscillator control signal and the at least one compensator control signal.

12. The self-adjusting regulator of claim 1, wherein the oscillator comprises a sawtooth oscillator.

13. The self-adjusting regulator of claim 1, wherein in the first switching speed ranges from about 5 Megahertz (MHz) to about 10 MHz.

14. The self-adjusting regulator of claim 1, wherein a power efficiency of the self-adjusting regulator in the low speed mode is about 90%, and a power efficiency of the self-adjusting regulator in the high speed mode is about 80%.

15. The self-adjusting regulator of claim 1, wherein the second switching speed ranges from about 100 MHz to about 500 MHz.

16. A method of using a self-adjusting regulator, the method comprises:
    generating an output voltage;
    receiving a reference voltage;
    determining a difference between the reference voltage and the output voltage;
    generating at least one oscillation control signal to adjust a switching rate of the self-adjusting regulator based on the difference between the reference voltage and the output voltage; and
    generating at least one bandwidth control signal to adjust a bandwidth of the self-adjusting regulator based on the difference between the reference voltage and the output voltage.

17. The method of claim 16, wherein generating the at least one oscillation control signal comprises:
    generating at least one first oscillation control signal corresponding to a first switching rate of the self-adjusting regulator if the difference between the reference voltage and the output voltage exceeds a threshold value; and
    generating at least one second oscillation control signal corresponding to a second switching rate of the self-adjusting regulator if the difference between the reference voltage and the output voltage is less than the threshold value, wherein the first switching rate is faster than the second switching rate.

18. The method of claim 16, wherein generating the at least one oscillation control signal comprises:
    generating at least one first bandwidth control signal corresponding to a first bandwidth of the self-adjusting regulator if the difference between the reference voltage and the output voltage exceeds a threshold value; and
    generating at least one second bandwidth control signal corresponding to a second bandwidth of the self-adjusting regulator if the difference between the reference voltage and the output voltage is less than the threshold value, wherein the first bandwidth is greater than the second bandwidth.

19. The method of claim 16, wherein generating the at least one oscillation control signal comprises:

generating at least one first oscillation control signal for a pre-determined number of cycles of the switching rate of self-adjusting regulator; and generating at least one second oscillation control signal following the pre-determined number of cycles, wherein the at least one first oscillation control signal is different from the at least one second oscillation control signal.

20. The method of claim 17, wherein the first switching rate ranges from about 100 Megahertz (MHz) to about 500 MHz, and the second switching rate ranges from about 5 MHz to about 10 MHz.

21. A method of using a self-adjusting regulator, the method comprising:

generating an output voltage using a power stage;

controlling the power stage using a control loop configured to control the power stage, wherein controlling the power stage comprises:

adjusting a bandwidth of the self-adjusting regulator in response to at least one compensator control signal using a compensator, and generating an oscillation signal using an oscillator to control a switching speed of the self-adjusting regulator in response to at least one oscillator control signal; and controlling the control loop using a voltage sensing control circuit, controlling the control loop comprises:

generating the at least one compensator control signal and the at least one oscillator control signal based on a comparison of the output voltage and a reference voltage, wherein in a low speed mode operating the self-adjusting regulator at a first bandwidth generated by the compensator, and at a first switching speed generated by the oscillator, and in a high speed mode operating the self-adjusting regulator at a second bandwidth generated by the compensator, and at a second switching speed generated by the oscillator, wherein the second bandwidth is greater than the first bandwidth, and the second switching speed faster than the first switching speed.

* * * * *